(12) United States Patent
Wang et al.

(10) Patent No.: US 12,547,430 B2
(45) Date of Patent: Feb. 10, 2026

(54) MODEL-BASED ELEMENT CONFIGURATION IN A USER INTERFACE

(71) Applicant: International Business Machines Corporation, Armonk, NY (US)

(72) Inventors: Jin Wang, Xian (CN); A Peng Zhang, Xian (CN); Lei Gao, Xian (CN); Xian Wu, Xian (CN); Xiang Zhen Gan, Xian (CN); Ke Du, Xian (CN)

(73) Assignee: International Business Machines Corporation, Armonk, NY (US)

( * ) Notice: Subject to any disclaimer, the term of this patent is extended or adjusted under 35 U.S.C. 154(b) by 412 days.

(21) Appl. No.: 18/128,106

(22) Filed: Mar. 29, 2023

(65) Prior Publication Data
US 2024/0330020 A1    Oct. 3, 2024

(51) Int. Cl.
G06F 9/451    (2018.01)
G06F 3/0482    (2013.01)

(52) U.S. Cl.
CPC ............ *G06F 9/451* (2018.02); *G06F 3/0482* (2013.01)

(58) Field of Classification Search
CPC ............................... G06F 9/451; G06F 3/0482
See application file for complete search history.

(56) References Cited

U.S. PATENT DOCUMENTS

| | | | |
|---|---|---|---|
| 7,770,109 B2 | 8/2010 | Fortes | |
| 9,116,600 B2 | 8/2015 | Gonsalves | |
| 10,788,951 B2 | 9/2020 | Allen et al. | |
| 11,030,386 B2 | 6/2021 | Hoford et al. | |
| 2005/0076294 A1 | 4/2005 | DeHamer et al. | |
| 2010/0325587 A1* | 12/2010 | Danton | G06F 3/04886 715/863 |
| 2013/0067261 A1* | 3/2013 | Carroll | G06F 1/28 713/323 |

(Continued)

OTHER PUBLICATIONS

Weld, Daniel S. et al. Automatically Personalizing User Interfaces. IJCAI'03: Proceedings of the 18th international joint conference on Artificial intelligence, Aug. 9, 2003 pp. 1613-1619. <https://www.eecs.harvard.edu/~kgajos/papers/2003/weld-ijcai03.pdf>.

(Continued)

*Primary Examiner* — Hien L Duong
(74) *Attorney, Agent, or Firm* — Daniel M. Yeates

(57) ABSTRACT

Techniques are described with regard to user interface configuration in a computing environment. An associated computer-implemented method includes initializing an element layout within a set of user interface layers for a certain user based upon random determination, wherein the element layout includes a plurality of elements on which the certain user operates. Responsive to determining that a predefined user history data threshold is exceeded, the method further includes deriving weight metrics for the plurality of elements in association with each of the set of user interface layers based upon user history data, applying at least one layout mode to respective elements among the plurality of elements associated with each of the set of user interface layers based upon the derived weight metrics, and updating the element layout within each of the set of user interface layers for the certain user consequent to applying the at least one layout mode.

17 Claims, 6 Drawing Sheets

(56) References Cited

U.S. PATENT DOCUMENTS

| | | | |
|---|---|---|---|
| 2014/0157188 A1* | 6/2014 | Miura | G06F 3/0485 |
| | | | 715/825 |
| 2015/0242374 A1 | 8/2015 | Kong et al. | |
| 2019/0220588 A1* | 7/2019 | Agarwal | G06F 3/016 |
| 2020/0026400 A1* | 1/2020 | Deselaers | G06F 3/0482 |
| 2020/0133693 A1* | 4/2020 | Rohde | G06F 3/167 |
| 2020/0265105 A1* | 8/2020 | Cui | G06N 20/00 |
| 2021/0286510 A1* | 9/2021 | Tyler | G06F 3/0484 |
| 2021/0342128 A1* | 11/2021 | Carraway | G06F 9/451 |
| 2023/0115575 A1* | 4/2023 | Tily | A61B 5/6801 |
| | | | 600/301 |
| 2023/0142052 A1* | 5/2023 | Asgekar | H04L 67/303 |
| | | | 709/217 |

OTHER PUBLICATIONS

Duan, Peitong et al. Optimizing User Interface Layouts via Gradient Descent. CHI '20: Proceedings of the 2020 CHI Conference on Human Factors in Computing Systems, Feb. 25, 2020, pp. 1-12. <https://arxiv.org/pdf/2002.10702.pdf>.

An Intelligent Self-Adapted Layout Designer. IP.com, IPCOM000168813D, Mar. 28, 2008. [8 printed pages] <https://priorart.ip.com/IPCOM/000168813>.

* cited by examiner

MODEL-BASED ELEMENT CONFIGURATION IN A USER INTERFACE

BACKGROUND

The various embodiments described herein generally relate to user interface configuration. More specifically, the various embodiments relate to automatically updating element configuration in a user interface based upon deriving element weight metrics and building a time series model.

SUMMARY

The various embodiments described herein provide techniques associated with user interface configuration in a computing environment. An associated computer-implemented method includes initializing an element layout within a set of user interface layers for a certain user, wherein the element layout is randomly determined responsive to assigning the certain user to a cluster among a plurality of clusters based upon user identification information, and wherein the element layout includes a plurality of elements on which the certain user operates. Responsive to determining that a predefined user history data threshold is exceeded, the method further includes deriving weight metrics for the plurality of elements in association with each of the set of user interface layers based upon user history data, applying at least one layout mode to respective elements among the plurality of elements associated with each of the set of user interface layers based upon the derived weight metrics, and updating the element layout within each of the set of user interface layers for the certain user consequent to applying the at least one layout mode.

According to one or more embodiments, deriving the weight metrics for the plurality of elements includes calculating an element weight value for each element among the plurality of elements based upon respective operation frequency values for the element for a plurality of slide windows of the user history data, wherein an operation frequency value among the respective operation frequency values represents a number of times the certain user operates on the element, and recalculating the element weight value for each element among the plurality of elements based upon building a time series model incorporating element operation frequency vector data, wherein the element operation frequency vector data is derived by recording an element operation frequency vector for each of the plurality of slide windows that indexes by operation frequency value a predefined number of elements among the plurality of elements. According to such one or more embodiments, deriving the weight metrics for the plurality of elements further includes deriving a full space layer weight vector for each element among the plurality of elements based upon any layer among the set of user interface layers in which the certain user operates on the element. According to such one or more embodiments, deriving the weight metrics for the plurality of elements further includes deriving respective layer-specific dot product weight values for each element among the plurality of elements by extracting from the full space layer weight vector portions specific to respective layers in the set of user interface layers.

According to one or more further embodiments, calculating the element weight value for each element among the plurality of elements includes summing respective products of an operation frequency value for the element and a slide window weight calculated for each of the plurality of slide windows of the user history data, wherein the slide window weight is relatively higher for relatively more recent slide windows among the plurality of slide windows. According to one or more further embodiments, building the time series model includes applying at least one machine learning algorithm to predict at least one future element operation frequency vector for at least one future slide window beyond the plurality of slide windows. Additionally or alternatively, building the time series model comprises training the time series model in conjunction with a long short-term memory recurrent neural network (LSTM-RNN) architecture configured to store at least one time series pattern associated with the element operation frequency vector data.

According to one or more further embodiments, applying the at least one layout mode to respective elements among the plurality of elements associated with each of the set of user interface layers includes, for a certain layer in the set of user interface layers, responsive to determining that a number of elements among the plurality of elements exceeds a predefined element quantity threshold, applying a focus mode in the certain layer to a subset of elements among the plurality of elements associated with the certain layer having relatively higher layer-specific dot product weight values, applying a sort mode in the certain layer to the subset of elements in order to arrange the subset of elements by layer-specific dot product weight value, and applying a disable mode in the certain layer to other elements among the plurality of elements associated with the certain layer.

According to one or more further embodiments, applying the at least one layout mode to respective elements among the plurality of elements associated with each of the set of user interface layers includes, for a certain layer in the set of user interface layers, responsive to determining that a number of elements among the plurality of elements does not exceed a predefined element quantity threshold, calculating for the certain layer a standard deviation value that accounts for all layer-specific dot product weight values. According to such one or more further embodiments, applying the at least one layout mode to respective elements among the plurality of elements associated with each of the set of user interface layers includes, for the certain layer in the set of user interface layers, responsive to determining that the calculated standard deviation value exceeds a standard deviation threshold, applying a focus mode in the certain layer to a subset of elements among the plurality of elements associated with the certain layer having relatively higher layer-specific dot product weight values, applying a sort mode in the certain layer to the subset of elements in order to arrange the subset of elements by layer-specific dot product weight value, and applying a disable mode in the certain layer to other elements among the plurality of elements associated with the certain layer. According to such one or more further embodiments, applying the at least one layout mode to respective elements among the plurality of elements associated with each of the set of user interface layers further includes, for the certain layer in the set of user interface layers, responsive to determining that the calculated standard deviation value does not exceed the standard deviation threshold, applying a sort mode in the certain layer to all elements among the plurality of elements associated with the certain layer in order to arrange all elements by layer-specific dot product weight value.

One or more additional embodiments pertain to a computer program product including a computer readable storage medium having program instructions embodied therewith. According to such embodiment(s), the program instructions are executable by a computing device to cause the computing device to perform one or more steps of and/or to implement one or more embodiments associated with the above recited computer-implemented method. One or more further embodiments pertain to a system having at least one processor and a memory storing an application program, which, when executed on the at least one processor, performs one or more steps of and/or implements one or more embodiments associated with the above recited computer-implemented method.

BRIEF DESCRIPTION OF THE DRAWINGS

So that the manner in which the above recited aspects are attained and can be understood in detail, a more particular description of embodiments, briefly summarized above, may be had by reference to the appended drawings. Note, however, that the appended drawings illustrate only typical embodiments of the invention and therefore are not to be considered limiting of its scope, for the invention may admit to other equally effective embodiments.

DETAILED DESCRIPTION

Figure 1:
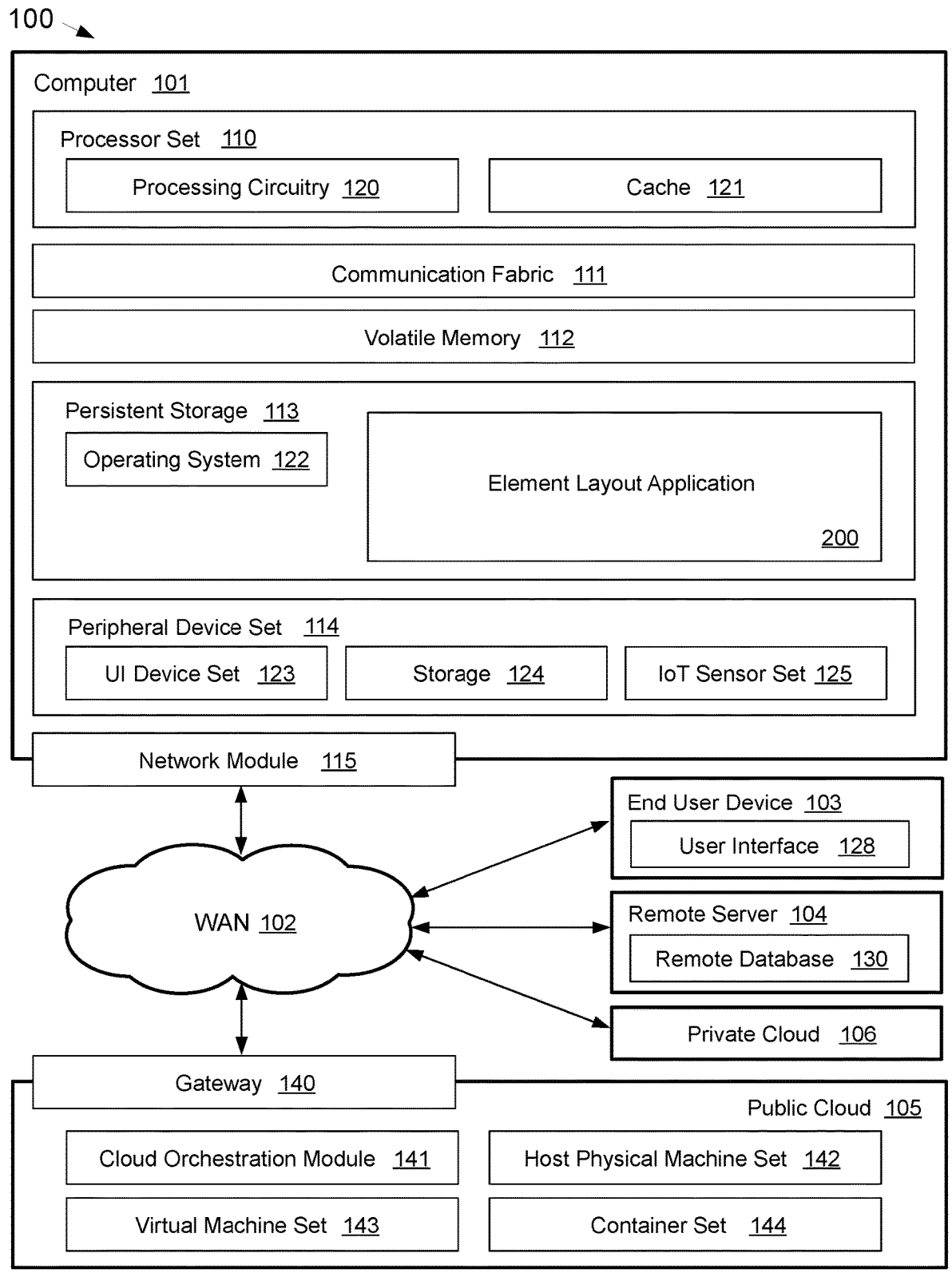
FIG. 1 illustrates a computing infrastructure, according to one or more embodiments.

The various embodiments described herein are directed to automatically updating element configuration in a user interface based upon element weight metrics derived and time series model predictions made in view of user history data. The various embodiments provide for randomly determined initialization of an element layout within a set of user interface layers, followed by an update of the element layout consequent to element weight metric derivation and time series model prediction.

The various embodiments described herein have advantages over conventional techniques. The various embodiments improve computer technology by facilitating initial random generation of an element layout in a user interface and then facilitating automatic update of the element layout based upon user history data. The various embodiments facilitate automatic update of the element layout by deriving element weight metrics from the user history data and refining the element weight metrics consequent to building a time series model. Building the time series model according to one or more of the various embodiments includes applying machine learning aspects to predict future element operation frequency data. Some of the various embodiments may not include all such advantages, and such advantages are not necessarily required of all embodiments.

In the following, reference is made to various embodiments of the invention. However, it should be understood that the invention is not limited to specific described embodiments. Instead, any combination of the following features and elements, whether related to different embodiments or not, is contemplated to implement and practice the invention. Furthermore, although embodiments may achieve advantages over other possible solutions and/or over the prior art, whether or not a particular advantage is achieved by a given embodiment is not limiting. Thus, the following aspects, features, embodiments, and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in one or more claims.

Various aspects of the present disclosure are described by narrative text, flowcharts, block diagrams of computer systems, and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one or more storage media (also called "mediums") collectively included in a set of one or more storage devices that collectively include machine readable code corresponding to instructions and/or data for performing computer operations specified in a given computer program product claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc), or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data typically is moved at some occasional points in time during normal operations of a storage device, such as during access, de-fragmentation, or garbage collection, but this does not render the storage device as transitory because the data is not transitory while it is stored.

Particular embodiments describe techniques relating to user interface configuration. However, it is to be understood that the techniques described herein may be adapted to a variety of purposes in addition to those specifically described herein. Accordingly, references to specific embodiments are included to be illustrative and not limiting.

With regard to FIG. 1, computing environment 100 includes an example of an environment for the execution of at least some of the computer code involved in performing the inventive methods, such as code included in or otherwise associated with element layout application 200. In addition to element layout application 200, computing environment 100 includes, for example, computer 101, wide area network (WAN) 102, end user device (EUD) 103, remote server 104, public cloud 105, and private cloud 106. In this embodiment, computer 101 includes processor set 110, communication fabric 111, volatile memory 112, persistent storage 113, peripheral device set 114, and network module 115. Processor set 110 includes processing circuitry 120 and cache 121. Persistent storage 113 includes operating system 122 and element layout application 200, as identified above. Peripheral device set 114 includes user interface (UI) device set 123, storage 124, and Internet of Things (IoT) sensor set 125. EUD 103 includes user interface 128. User interface 128 is representative of a single user interface or multiple user interfaces. Remote server 104 includes remote database 130. Remote database 130 is representative of a single remote database or multiple remote databases. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer, or any other form of computer or mobile device now known or to be developed in the future that is capable of running a program, accessing a network, or querying a database, such as remote database 130. Computer 101 is included to be representative of a single computer or multiple computers. As is well understood in the art of computer technology, and depending upon the technology, performance of a computer-implemented method may be distributed among multiple computers and/or between multiple locations. As depicted in FIG. 1, detailed discussion is focused on a single computer, specifically computer 101, to keep the presentation of computing environment 100 as simple as possible. Additionally or alternatively to being connectively coupled to public cloud 105 and private cloud 106, computer 101 may be located in a cloud, even though it is not shown in a cloud in FIG. 1. On the other hand, computer 101 is not required to be in a cloud or connectively coupled to a cloud except to any extent as may be affirmatively indicated.

Processor set 110 includes one or more computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories typically are organized into multiple levels depending upon relative proximity to the processing circuitry. Alternatively, some, or all, of the cache 121 for processor set 110 may be located "off chip". In some computing environments, processor set 110 may be designed for working with qubits and performing quantum computing.

Computer readable program instructions typically are loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions and associated data are accessed by processor set 110 to control and direct performance of the inventive methods. In computing environment 100, at least some of the instructions for performing the inventive methods may be stored in element layout application 200 in persistent storage 113.

Communication fabric 111 is the signal conduction path that allows the various components of computer 101 to communicate with each other. Typically, this fabric is made of switches and electrically conductive paths, such as the switches and electrically conductive paths that make up buses, bridges, physical input/output ports, and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, volatile memory 112 is located in a single package and is internal to computer 101, but additionally or alternatively volatile memory 112 may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data, and rewriting of data. Some familiar forms of persistent storage include magnetic disks and solid state storage devices. Operating system 122 may take several forms, such as various known proprietary operating systems or open source Portable Operating System Interface-type operating systems that employ a kernel. Element layout application 200 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (e.g., secure digital (SD) card), connections made through local area communication networks, and even connections made through wide area networks such as the Internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database), such storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor among IoT sensor set 125 may be a thermometer, and another sensor may be a motion detector.

Network module 115 is the collection of computer software, hardware, and firmware that allows computer 101 to communicate with other computers through WAN 102. Network module 115 may include hardware such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments, e.g., embodiments that utilize software-defined networking (SDN), the control functions and the forwarding functions of network module 115 are performed on physically separate devices, such that the control functions manage several different network hardware devices. Computer readable program instructions for performing the inventive methods typically can be downloaded to computer 101 from an external computer or external storage device through a network adapter card or network interface included in network module 115.

Wide area network (WAN) 102 is any wide area network, e.g., the Internet, capable of communicating computer data over non-local distances by any technology for communicating computer data, now known or to be developed in the future. In some embodiments, WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers, and edge servers.

End user device (EUD) 103 is any computer system that is used and controlled by an end user, e.g., a customer of an enterprise that operates computer 101. EUD 103 may take any of the forms previously discussed in connection with computer 101. EUD 103 typically receives helpful and useful data from the operations of computer 101. For example, in a hypothetical case where computer 101 is designed to provide a recommendation to an end user, such recommendation typically would be communicated from network module 115 of computer 101 through WAN 102 to EUD 103. In this way, EUD 103 can display, or otherwise present, the recommendation to an end user, e.g., via user interface 128. In another example, in a hypothetical case where computer 101 is designed to provide configuration information to user interface 128, e.g., via element layout application 200, such configuration information typically would be communicated from network module 115 of computer 101 through WAN 102 to EUD 103. In some embodiments, EUD 103 may be a client device, such as thin client, heavy client, mainframe computer, desktop computer, and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data (e.g., user history data), such historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. Public cloud 105 optionally offers infrastructure as a service (IaaS), platform as a service (PaaS), software as a service (SaaS), and/or other cloud computing services. The computing resources provided by public cloud 105 typically are implemented by virtual computing environments (VCEs) that run on various computers making up the computers of host physical machine set 142, which is the universe of physical computers in and/or available to public cloud 105. The VCEs typically take the form of virtual machines from virtual machine set 143 and/or containers from container set 144. It is understood that such VCEs may be stored as images and may be transferred among and between the various physical machine hosts, either as images or after instantiation of the VCE. Cloud orchestration module 141 manages the transfer and storage of images, deploys new instantiations of VCEs, and manages active instantiations of VCE deployments. Gateway 140 is the collection of computer software, hardware, and firmware that allows public cloud 105 to communicate through WAN 102.

Some further explanation of VCEs will now be provided. VCEs can be stored as "images". A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the perspective of programs running in them. A computer program running on an ordinary operating system can utilize all resources of that computer, such as connected devices, files and folders, network shares, central processing unit (CPU) power, and quantifiable hardware capabilities. However, programs running inside a container only can use the contents of the container and devices assigned to the container, a feature which is known as containerization.

Private cloud 106 is similar to public cloud 105, except that the computing resources only are available for use by a single enterprise. While private cloud 106 is depicted in FIG. 1 as being in communication with WAN 102, in other embodiments a private cloud optionally is disconnected from the Internet or other public network entirely and is accessible only through a local/private network. A hybrid cloud is a composition of multiple clouds of different types (e.g., private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 both are part of a larger hybrid cloud.

In the context of the various embodiments described herein, components of computing environment 100, including aspects of element layout application 200, provide, or are configured to provide, any entity associated with user interface configuration, e.g., any entity associated with computer 101, EUD 103, or another aspect of computing environment 100, advance notice of any personal data collection. Components of computing environment 100 further provide, or further are configured to provide, any affected entity an option to opt in or opt out of any such personal data collection at any time. Optionally, components of computing environment 100 further transmit, or further are configured to transmit, notification(s) to any affected entity each time any such personal data collection occurs and/or at designated time intervals.

Figure 2:
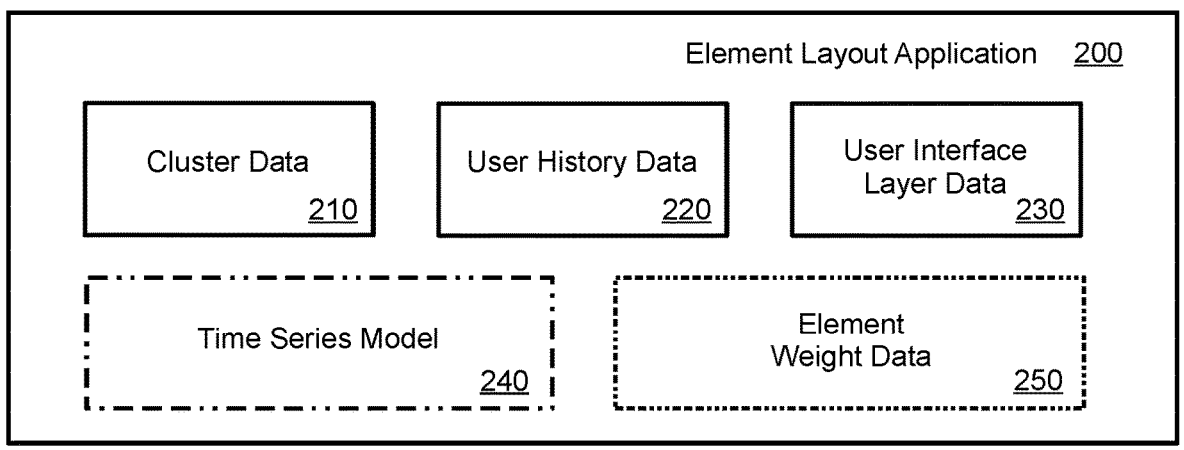
FIG. 2 illustrates an example schematic diagram of an element layout application, according to one or more embodiments, according to one or more embodiments.

FIG. 2 illustrates an example schematic diagram of element layout application 200. Element layout application 200 includes cluster data 210, user history data 220, and user interface layer data 230. Cluster data 210 includes data associated with a plurality of clusters, each of which including a plurality of users for which the element layout application may randomly determine an element layout within a set of user interface layers of user interface 128. User history data 220 includes data associated with user operations in user interface 128. User interface layer data 230 includes data associated with the set of user interface layers of user interface 128, including any predefined layer data. Element layout application 200 further includes time series model 240. Time series model 240 is a machine learning knowledge model configured to predict time series data for elements associated with user interface 128. Element layout application 200 further includes element weight data 250 derived based upon user history data 220 and optionally further derived based upon user interface layer data 230 and/or application of time series model 240.

Figure 3:
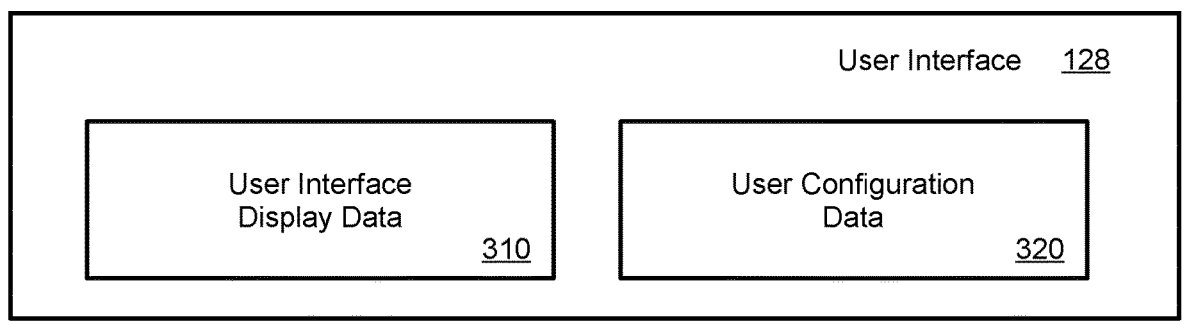
FIG. 3 illustrates an example schematic diagram of a user interface, according to one or more embodiments.

FIG. 3 illustrates an example schematic diagram of user interface 128. User interface 128 includes user interface display data 310 and user configuration data 320. User interface display data 310 is received from element layout application 200 and determines relative positioning of elements within respective layer(s) in the set of user interface layers of user interface 128. User configuration data 320 includes data associated with at least one user configuration aspect related to user interface 128. User configuration data 320 includes data associated with any user-designated threshold or other user-designated setting related to user interface 128.

Figure 4:
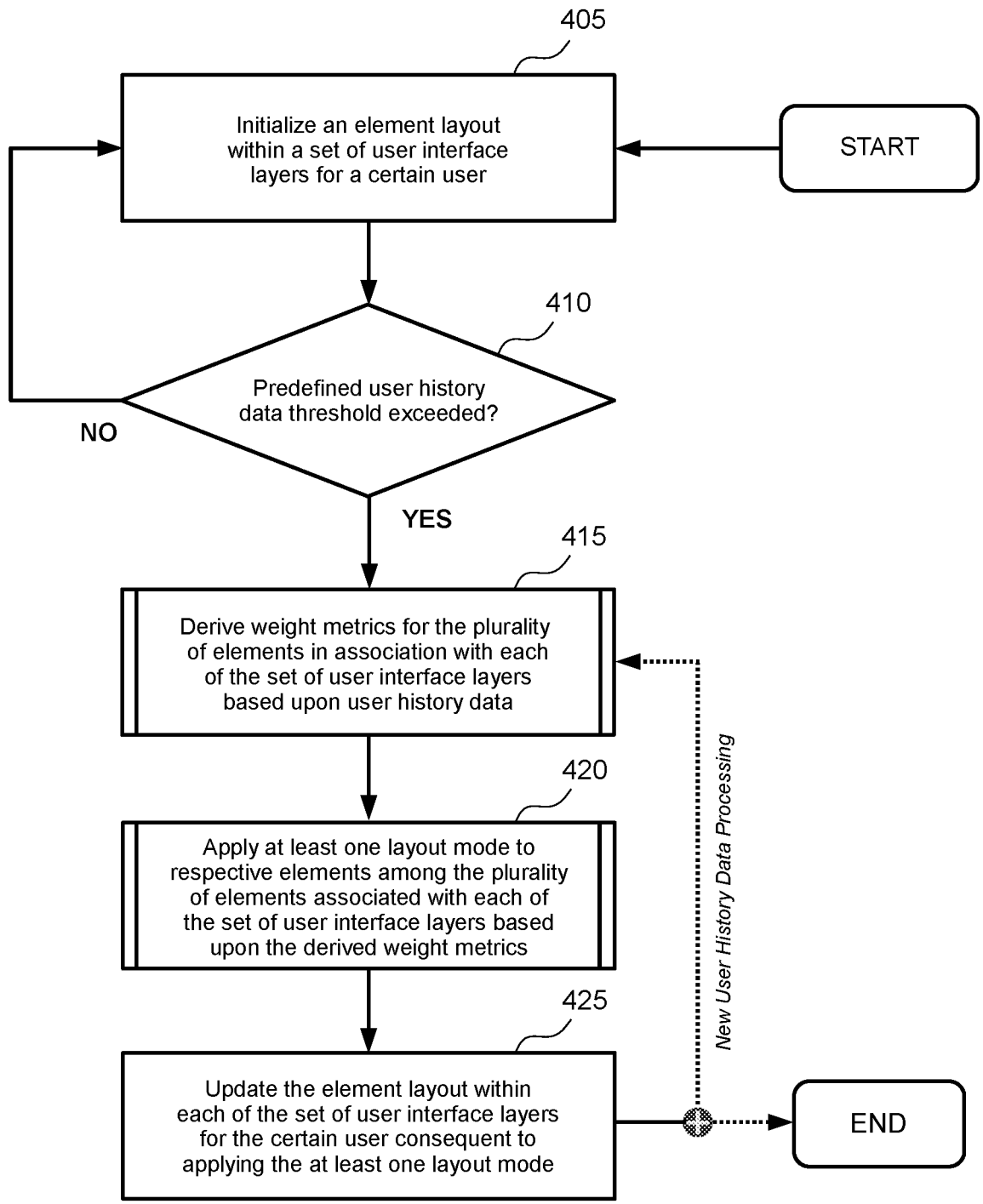
FIG. 4 illustrates a method of automatically updating element configuration in a user interface, according to one or more embodiments.

FIG. 4 illustrates a method 400 of automatically updating element configuration in a user interface (e.g., user interface 128). One or more steps associated with the method 400 and related methods described herein optionally are carried out via an element layout application in a computing environment (e.g., via element layout application 200 included in computer 101 of computing environment 100). One or more steps associated with the method 400 and the other methods described herein optionally are carried out within, or in association with, one or more workloads of a cloud computing environment. Such cloud computing environment optionally includes a public cloud (e.g., public cloud 105) and/or a private cloud (e.g., private cloud 106).

The method 400 begins at step 405, where the element layout application initializes an element layout within a set of user interface layers for a certain user. The set of user interface layers defines a depth dimension within the user interface. According to step 405, the element layout application randomly determines the element layout during initialization responsive to assigning the certain user to a cluster among a plurality of clusters based upon user identification information. The element layout includes a plurality of elements on which the certain user operates. In the context of the various embodiments, the element layout application configures the plurality of elements in the user interface. In an embodiment, the certain user is among a plurality of users interacting with the user interface. In an additional embodiment, the user interface is incorporated into or is otherwise associated with an end user device (e.g., EUD 103) communicably coupled to the element layout application via a network (e.g., WAN 102). The element layout application sends element layout data and any additional element configuration data to the user interface. Such data is stored in association with the user interface as user interface display data (e.g., user interface display data 310).

In an embodiment, the user interface is or incorporates aspects of a graphical user interface (GUI), e.g., associated with a webpage or other network aspect. According to such embodiment, the plurality of elements include graphical aspects, wherein all or some graphical aspects optionally are placed in respective positions within the user interface. In an additional embodiment, the user interface is or incorporates aspects of a command line interface (CLI). According to such additional embodiment, the plurality of elements include command result aspects, wherein all or some command result aspects optionally are represented in a tree structure, and wherein respective levels of the tree structure are represented as respective layers in the set of user interface layers. In a further embodiment, the user interface includes at least one sensory interface aspect configured to discern and process sound/voice commands and/or gestures. In a further embodiment, the user interface includes at least one haptic interface aspect configured to discern and process touch-based commands and/or gestures. In a further embodiment, the user interface is structurally predefined. According to such further embodiment, the set of user interface layers is predefined in accordance with structural aspects of the predefined user interface. For instance, in the context of a webpage associated with an internet (e.g., the Internet) or an intranet, the user interface is predefined based upon an HTML <div> structure, and the element layout application organizes, e.g., positions, respective elements among the plurality of elements in a set of predefined layers associated with the HTML <div> structure. In another instance, in the context of a data sequence, the element layout application organizes respective elements among the plurality of elements in the user interface based upon a predefined structure of the sequence.

In the context of the various embodiments, respective layers in the set of user interface layers are hypotactic and are arranged from greatest (top layer) to least (bottom layer) in terms of user interface scope. Accordingly, a top layer of the set of user interface layers encompasses the entirety of scope in the user interface, while a bottom layer of the set of user interface layers encompasses the least scope in the user interface. The element layout application stores data associated with the set of user interface layers, including predefined aspects thereof, among user interface layer data (e.g., user interface layer data 230). The element layout application stores data associated with the plurality of clusters, including data associated with the cluster to which the certain user is assigned, among cluster data (e.g., cluster data 210). In an embodiment, the user identification information based upon which the certain user is assigned to a cluster among the plurality of clusters per step 405 is provided automatically to the element layout application by at least one application associated with the certain user. Additionally or alternatively, the user identification information is provided to the element layout application by the certain user, e.g., via at least one user configuration aspect associated with the user interface. The at least one user configuration aspect optionally is integrated into the user interface configured according to this method, e.g., as one or more user configuration elements among the plurality of elements, or alternatively is presented separately to the certain user within at least one additional user interface associated with the end user device. The at least one user configuration aspect is stored in association with the user interface as user configuration data (e.g., user configuration data 320). In an additional embodiment, the user identification information includes user role. In a further embodiment, the user identification information includes an operating system environment associated with the certain user. In a further embodiment, the user identification information includes any application type associated with the certain user.

In an embodiment, the element layout application randomly determines the element layout according to step 405 by selecting, for the cluster to which the certain user is assigned, a random number corresponding to a layout configuration among a plurality of layout configurations. In a related embodiment, the element layout application selects the random number by calling a random number function, e.g., a random number integer function returning a random integer. In a further related embodiment, in the context of initializing the element layout per step 405, the element layout application constantly modifies the randomly determined element layout in the user interface for the certain user until a predefined user history data threshold is exceeded, as further described herein. According to such further related embodiment, the element layout application optionally modifies the randomly determined element layout periodically after predefined time intervals. The predefined time intervals optionally are specified by the certain user, e.g., via the at least one user configuration aspect associated with the user interface, or alternatively are specified by a system administrator associated with computer 101 or computing environment 100 more generally. In a further related embodiment, the element layout application modifies the randomly determined element layout after a predefined time interval by selecting, for the cluster to which the certain user is assigned, a new random number corresponding to a new layout configuration among the plurality of layout configurations. Additionally or alternatively, the element layout application modifies the randomly determined element layout periodically until a predetermined minimum quantity of feedback is received in association with the certain user. Responsive to receiving the predetermined minimum quantity of feedback, the element layout application optionally modifies the element layout in accordance with the feedback. The element layout application optionally collects feedback for the certain user directly from the certain user, e.g., via the at least one user configuration aspect associated with the user interface. Additionally or alternatively, the element layout application automatically generates feedback based upon activity of the certain user responsive to the randomly determined element layout.

At step 410, the element layout application determines whether a predefined user history data threshold is exceeded. Responsive to determining that the predefined user history data threshold is not exceeded, the element layout application continues initialization of the element layout according to step 405, e.g., by constantly modifying the randomly determined element layout as previously described. Responsive to determining that the predefined user history data threshold is exceeded, at step 415 the element layout application derives weight metrics for the plurality of elements in association with each of the set of user interface layers based upon user history data (e.g., user history data 220). The predefined user history data threshold is a specified amount of user history data associated with the certain user, e.g., in terms of data size and/or data structure rows. The predefined user history data threshold optionally is designated by the certain user, e.g., via the at least one user configuration aspect associated with the user interface, or alternatively is designated by the system administrator. According to step 415, by determining that the predefined user history data threshold is exceeded, the element layout application quantitatively determines that a sufficient amount of user history data is available for purposes of updating the element layout based upon the user history data. The element layout application stores the derived weight metrics for the plurality of elements among element weight data (e.g., element weight data 250).

In an embodiment, the user history data analyzed in the context of the method 400 and related methods is data associated with the certain user collected by the element layout application. Optionally, the user history data incorporates data from a plurality of users, including from other users in addition to the certain user. In an additional embodiment, the element layout application records the user history data as element operation datapoints in a data structure. In a further embodiment, some or all aspects of the user history data are stored in at least one database associated with the computing environment. According to such further embodiment, aspects of the user history data optionally are stored within persistent storage (e.g., persistent storage 113) and/or within at least one remote database (e.g., remote database 130). Each element operation datapoint is associated with an element among the plurality of elements. The element operation datapoints optionally include, but are not limited to, an operation layer datapoint indicative of any layer in the set of user interface layers in which the certain user operates on the element, a last operation time datapoint indicative of a last operation time at which the certain user operates on an element, and an operation frequency datapoint indicative of a number of times the certain user operates on an element, e.g., within a predefined time interval. In a related embodiment, the data structure in which the element layout application records the user history data is a table, i.e., a user history data table. According to such related embodiment, the element layout application records element operation datapoints in table rows, with each row representing at least one operation occurrence associated with a respective element among the plurality of elements.

According to step 415, the element layout application derives the weight metrics for each element among the plurality of elements in order to derive a full space layer weight vector for each element. Based upon the full space layer weight vector derived for each element among the plurality of elements, the element layout application derives respective layer-specific dot product weight values for each element by extracting from the full space layer weight vector portions specific to respective layers in the set of user interface layers. With respect to a certain layer in the set of user interface layers, the element layout application derives a layer-specific dot product weight value for each element by extracting from the full space layer weight vector portions specific to the certain layer. A method of deriving the weight metrics for the plurality of elements in accordance with step 415 is described with respect to FIG. 5.

At step 420, the element layout application applies at least one layout mode to respective elements among the plurality of elements associated with each of the set of user interface layers based upon the weight metrics derived per step 415. According to step 420, application of the at least one layout mode is layer-specific such that the element layout application applies at least one layout mode separately for each layer in the set of user interface layers. According to step 420, the element layout application applies at least one layout mode to any element among the plurality of elements associated with a certain layer in the set of user interface layers. In an embodiment, the element layout application applies at least one layout mode among a set of layout modes including, but not limited to, at least one enable mode and at least one disable mode. In a related embodiment, the at least one enable mode includes, but is not limited to, a focus mode and a sort mode. According to such related embodiment, in the context of applying a focus mode to a certain element or group of elements associated with a certain layer in the set of user interface layers, the element layout application optionally zooms in on or otherwise focuses upon the certain element or group of elements. Additionally or alternatively, in the context of applying a focus mode to a certain element or group of elements associated with a certain layer in the set of user interface layers, the element layout application optionally enlarges at least one portion of the certain layer including or related to the certain element or group of elements. According to such related embodiment, in the context of applying a sort mode to a group of elements associated with a certain layer in the set of user interface layers, the element layout application optionally sorts the group of elements in descending order. The element layout application optionally sorts the group of elements in descending order based upon at least one element weight metric, e.g., based upon layer-specific dot product weight value derived for the certain layer. According to such related embodiment, consequent to applying a sort mode, the element layout application displays or otherwise positions the plurality of elements associated with the certain layer in descending order of prominence within the certain layer based upon prioritization order, such that elements of relatively higher priority (i.e., sorted relatively higher) are displayed or otherwise positioned relatively more prominently within the certain layer and elements of relatively lower priority (i.e., sorted relatively lower) are displayed or otherwise positioned relatively less prominently within the certain layer. According to such related embodiment, consequent to applying a sort mode, the element layout application displays or otherwise positions an element prioritized highest at a most prominent location in the certain layer, e.g., in a first line/section/frame of a webpage or at a central location on a webpage. In an additional related embodiment, the at least one disable mode includes, but is not limited to, a hide mode and a delete mode. According to such related embodiment, in the context of applying a hide mode or a delete mode to an element associated with a certain layer in the set of user interface layers, the element layout application optionally omits the element from view within the certain layer. According to such related embodiment, in the context of applying a delete mode to an element associated with a certain layer in the set of user interface layers, the element layout application optionally deletes or otherwise makes inaccessible information associated with the element in the context of the certain layer. In an embodiment, the element layout application applies the at least one layout mode to elements among the plurality of elements associated with a certain layer in the set of user interface layers based upon a layer-specific dot product weight value calculated for each element among the plurality of elements. A method of applying the at least one layout mode to respective elements among the plurality of elements associated with each of the set of user interface layers in accordance with step 420 is described with respect to FIG. 6.

At step 425, the element layout application updates the element layout within each of the set of user interface layers for the certain user consequent to applying the at least one layout mode per step 420. According to step 425, the element layout application updates the element layout for a certain layer in the set of user interface layers based upon the at least one layout mode applied to respective elements among the plurality of elements associated with the certain layer. In an embodiment, the element layout application proceeds to the end of the method 400 upon updating the element layout. In an alternative embodiment, the element layout application returns to step 415 in order to process new user history data received beyond the user history data already processed in accordance with steps 415-425. According to such alternative embodiment, the element layout application updates the element layout again based upon processing the new user history data. In a related embodiment, the element layout application returns to step 415 responsive to determining that a predefined new user history data threshold is exceeded. The predefined new user history data threshold optionally is designated by the certain user, e.g., via the at least one user configuration aspect associated with the user interface, or alternatively is designated by the system administrator. The predefined new user history data threshold optionally is equivalent to the predefined user history data threshold, alternatively is less than the predefined user history data threshold, or alternatively is greater than the predefined user history data threshold. In a further related embodiment, the element layout application returns to step 415 responsive to determining that a predefined duration of time elapses following the element layout update completed per step 425. According to such further related embodiment, the element layout application updates the element layout again based upon processing any new user history data received during the predefined duration of time. In a further embodiment, the element layout application processes the new user history data in view of previously received user history data, e.g., by deriving element weight metrics with respect to the new user history data in view of previously received user history data.

Figure 5:
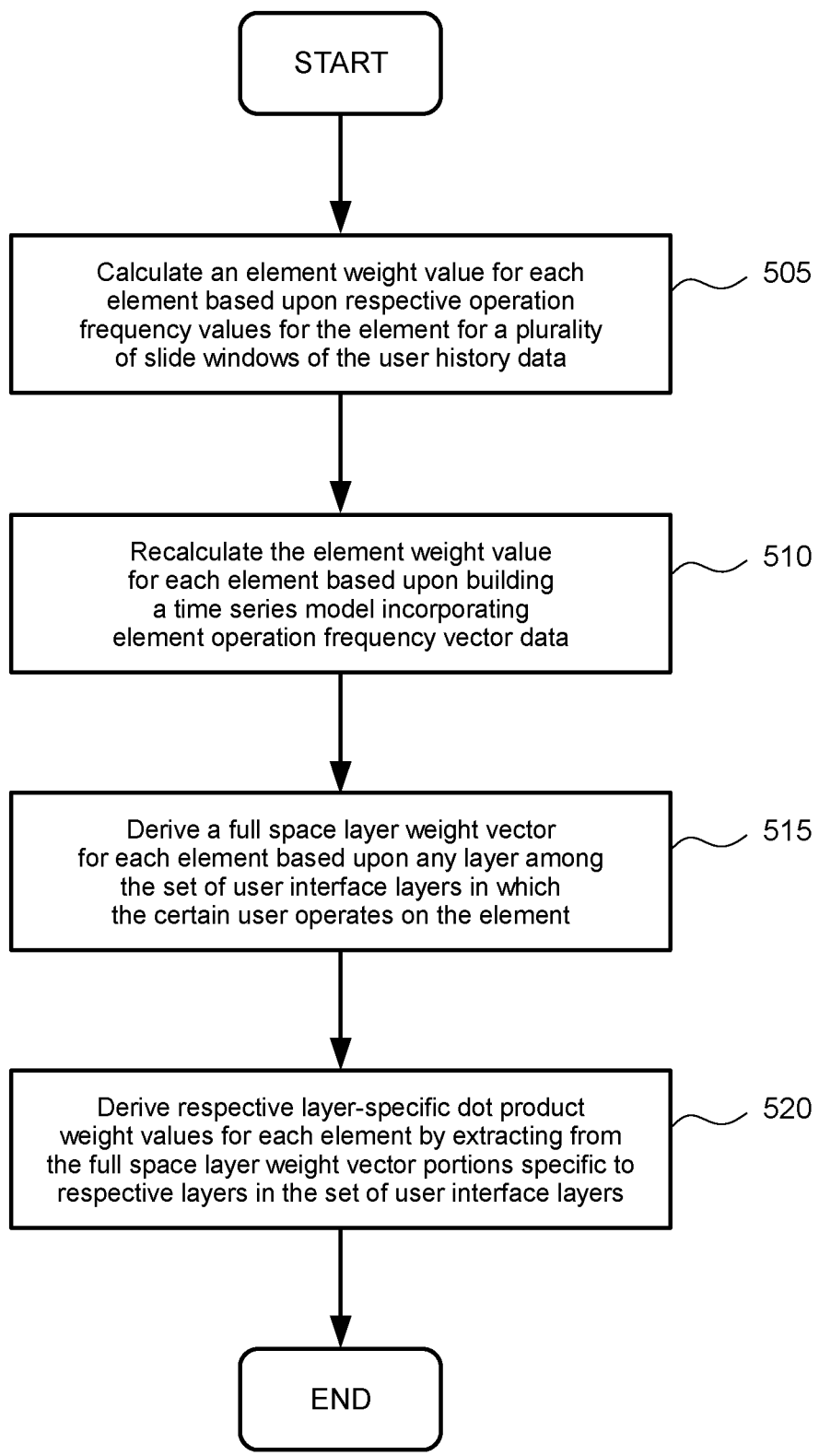
FIG. 5 illustrates a method of deriving weight metrics for a plurality of elements associated with a user interface, according to one or more embodiments.

FIG. 5 illustrates a method 500 of deriving the weight metrics for the plurality of elements. The method 500 provides one or more embodiments with respect to step 415 of the method 400. The method 500 begins at step 505, where the element layout application calculates an element weight value for each element among the plurality of elements based upon respective operation frequency values for the element for a plurality of slide windows of the user history data, wherein an operation frequency value among the respective operation frequency values represents a number of times the certain user for which the user interface is configured operates on the element, e.g., within a predefined time interval. The element weight value calculated for each element per step 505 is not layer-specific and thus is applicable for each of the set of user interface layers. As further described herein, the element weight value is applied to derive layer-specific weight values in other steps of the method 500. In an embodiment, the element layout application reviews operation frequency data for respective elements among the plurality of elements for each of the plurality of slide windows by reviewing a predefined amount of the user history data, e.g., a predefined number of user history table rows, in each slide window. In the context of the various embodiments, a slide window is a predefined size window of the user history data, e.g., a predefined number of user history table rows, reviewed sequentially by the element layout application within a certain interval. The predefined amount of the user history data reviewed within a slide window is based upon slide window width. In the context of the various embodiments, slide window width is a predefined value indicating an amount of the user history data, e.g., a number of table rows, reviewed within a slide window. Upon reviewing a slide window of user history data, e.g., a group of user history table rows of predefined number as determined by the slide window width, the element layout application completes a slide window step by advancing by a predefined step size to a next slide window of the user history data, e.g., by advancing by the predefined step size to a next group of user history table rows of predefined number as determined by the slide window width. In the context of the various embodiments, a step size is an amount of the user history data, e.g., a number of user history table rows, by which a slide window is advanced from one slide window to a next slide window. In the context of the various embodiments, a total number of slide window steps among the plurality of slide windows is indicative of a quantity of slide windows of user history data reviewed, e.g., a quantity of slide windows of user history table rows reviewed. In an embodiment, step size is less than slide window width in order to ensure data continuity among the plurality of slide windows. In an embodiment, the plurality of slide windows, as well as the total number of slide window steps, is determined based upon amount of user history data reviewed, e.g., based upon a number of rows of user history table data. In an additional embodiment, slide window width is predefined as a square root of a number of user history table rows, e.g., given a user history table of M rows, slide window width is sqrt(M). In a related embodiment, step size is a predefined fraction of slide window width. According to such related embodiment, step size is a predefined fraction of a square root of a number of user history table rows. According to such related embodiment, step size optionally is one half of slide window width, e.g., given the aforementioned user history table of M rows, slide window width is sqrt(M)/2. For example, according to such embodiments, given a user history table of 100 rows, slide window width is sqrt(100)=10, the step size is sqrt(100)/2=5, and a number of total slide window steps N is 19, since the slide window must be moved 19 times in order to review all 100 rows. In such example, the number of slide windows among the plurality of slide windows also is 19.

In an embodiment, the element layout application calculates the element weight value for each element among the plurality of elements by summing respective products of an operation frequency value for the element and a slide window weight calculated for each of the plurality of slide windows of the user history data. The respective products calculated for each of the plurality of slide windows that are summed according to such embodiment are derived by reviewing the user history data, e.g., user history table rows, over the total number of slide window steps. According to such embodiment, the slide window weight is relatively higher for relatively more recent slide windows among the plurality of slide windows. The slide window weight metric provides a weight bias toward user history data processed in relatively more recent slide windows, since such data theoretically is more informative of current and future activity associated with the certain user. In a related embodiment, the slide window weight $W_n$ for a certain slide window n is a ratio of n to the sum of 1 to number of total slide window steps N, such that $W_n=n/(1+2+\ldots N)$. In a further related embodiment, element weight value $W_E$ for a certain element among the plurality of elements is represented by a summation, for each slide window n from slide window step 1 to slide window step N, of respective products of an operation frequency value operationfrequency$_n$ for the certain element in the slide window and a slide window weight $W_n$ of the slide window. Based upon such related embodiment, element weight value $W_E$ for the certain element is $W_E=\Sigma$ (operationfrequency$_n$*$W_n$), where X is from 1 to N. Written in expanded form based upon the summation, element weight value $W_E$ for the certain element is $W_E=$(operationfrequency$_1$*$W_1$)+ ... (operationfrequency$_N$*$W_N$).

At step 510, the element layout application recalculates the element weight value for each element among the plurality of elements based upon building a time series model (e.g., time series model 240) incorporating element operation frequency vector data. The layout element application derives the element operation frequency vector data by recording an element operation frequency vector for each of the plurality of slide windows that indexes by operation frequency value a predefined number of elements among the plurality of elements. By deriving the element operation frequency vector data, the element layout application refines the element weight values calculated for each element among the plurality of elements per step 505 in order to account for future slide window activity beyond the plurality of slide windows of the user history data. In an embodiment, for each slide window among the plurality of slide windows, the element layout application derives an element operation frequency vector that lists a set of elements among the plurality of elements in order of descending operation frequency value. According to such embodiment, an element operation frequency vector is directed by operation frequency value. According to such embodiment, an element operation frequency vector $V_{OF}$ including X elements among the plurality of elements for slide window n is $V_{OF\_n}$=(E1→E2→ ... EX). For instance, given an element operation frequency vector of 3 elements, an element operation frequency vector for a slide window n is $V_{OF\_n}$=(E1→E2→E3), where element E1 has highest operation frequency value in slide window n, element E2 has second highest operation frequency value in slide window n, and element E3 has third highest operation frequency value in slide window n.

In an embodiment, the element layout application derives an element operation frequency vector including all elements among the plurality of elements in order of descending operation frequency value, such that the predefined number of elements in the vector is equivalent to an overall number of elements among the plurality of elements. Alternatively, the element layout application derives an element operation frequency vector including a subset of elements among the plurality of elements in order of descending operation frequency value, such that the predefined number of elements in the vector is equivalent to a number of elements among the plurality of elements in the subset of elements. A quantity of elements among the plurality of elements to include in an element operation frequency vector optionally is determined by the certain user, e.g., via the at least one user configuration aspect associated with the user interface, or alternatively is determined by the system administrator. Including all elements among the plurality of elements in an element operation frequency vector increases computation time but also increases accuracy relative to including only a subset of elements among the plurality of elements in an element operation frequency vector. Thus, the certain user or the system administrator may opt to include all elements in an element operation frequency vector to prioritize accuracy over computation time or alternatively may opt to include a subset of elements in an element operation frequency vector to prioritize computation time over accuracy.

In the context of the various embodiments, a time series model is a machine learning knowledge model configured to process time series data associated with the plurality of elements. A time series model in the context of the various embodiments optionally encompasses any machine learning knowledge model or portion(s) thereof configured to process time series data. In an embodiment, the element layout application builds the time series model by applying at least one machine learning algorithm to predict at least one future element operation frequency vector for at least one future slide window beyond the plurality of slide windows of the user history data. According to such embodiment, the element layout application applies the at least one machine learning algorithm to the element operation frequency vector data in order to predict future element operation frequency vector data. According to such embodiment, the element layout application builds the time series model by incorporating data associated with the respective element operation frequency vectors derived for each of the plurality of slide windows of the user history data in order to predict at least one future element operation frequency vector for at least one future slide window beyond the plurality of slide windows. In a related embodiment, the at least one machine learning algorithm includes a statistical algorithm incorporating aspects of an autoregressive integrated moving average (ARIMA) model. In the context of the various embodiments, an ARIMA model is configured to analyze time series data associated with the respective element operation frequency vectors derived for each of the plurality of slide windows in order to predict time series data pertaining to at least one future element operation frequency vector for at least one future slide window. In a further related embodiment, the at least one machine learning algorithm includes a statistical algorithm incorporating aspects of a temporal causal model (TCM). In the context of the various embodiments, a TCM model is configured to discover key causal relationships in time series data associated with the respective element operation frequency vectors derived for each of the plurality of slide windows.

In an embodiment, a number of element operation frequency vectors predicted, and thus a number of future slide windows predicted, based upon the time series model optionally is predefined by the certain user, e.g., via the at least one user configuration aspect associated with the user interface, or alternatively is predefined by the system administrator. Such determination optionally is based upon user implementation and/or characteristics associated with the user interface. Referring to the aforementioned example, given a user history table of 100 rows, slide window width is sqrt(100)=10, the step size is sqrt(100)/2=5, a number of total slide window steps N is 19, and the element layout application derives 19 respective element operation frequency vectors for each of the 19 slide windows, i.e., for each of the 19 slide window steps. According to such example, given 1 future element operation frequency vector to be predicted, the element layout application may build the time series model by incorporating data associated with the respective element operation frequency vectors derived for each of the 19 slide windows in order to predict a 20th element operation frequency vector based upon a predicted 20th slide window.

In an embodiment, upon predicting at least one future element operation frequency vector for at least one future slide window beyond the plurality of slide windows of the user history data, according to step 510 the element layout application recalculates the element weight value calculated for each element among the plurality of elements per step 505 by factoring in predicted operation frequency from the at least one future element operation frequency vector. According to such embodiment, the element layout application recalculates the element weight value for each element by adding predicted future operation frequency vector data for the at least one future slide window beyond the plurality of slide windows. Thus, in the aforementioned example, given that there is 1 predicted 20th slide window, the element layout application recalculates the element weight value for each of the plurality of elements by adding the predicted 20th slide window to the 19 slide windows. To recalculate the element weight value for each of the plurality of elements per step 510 in the context of the element weight value summation embodiment described in step 505, recalculated element weight value $W_{E\_RECALCULTED}$ for a certain element among the plurality of elements is represented by a summation, for each slide window n from slide window step 1 to slide window step N+P, of respective products of an operation frequency value operationfrequency$_n$ for the certain element in the slide window and a slide window weight $W_n$ of the slide window, such that $W_{E\_RECACLULATED}=\Sigma$ (operationfrequency$_n$*$W_n$), where X is from 1 to N+P. Written in expanded form based upon the summation, element weight value $W_{E\_RECACLULATED}$ for the certain element is $W_{E\_RECACLULATED}=$(operationfrequency$_1$*$W_1$)+ . . . (operationfrequency$_{N+P}$*$W_{N+P}$). The "N+P" represents the original number of total slide window steps (N) over the plurality of slide windows plus a further P steps created by extending the user history data analysis over predicted future slide window(s) consequent to building the time series model. In the aforementioned example, since there is 1 predicted slide window in addition to the 19 original slide windows, which requires 1 further slide window step, N=19 and P=1, such that N+P=19+1=20. By building a time series model to predict future element operation frequency vector data according to step 510, the element layout application applies machine learning in order to predict operation frequency associated with the plurality of elements, thus enabling element weight value recalculation to increase accuracy of future element layout configuration for the certain user.

In an embodiment, the element layout application builds the time series model per step 510 by training the time series model in conjunction with a long short-term memory recurrent neural network (LSTM-RNN) architecture configured to store at least one time series pattern associated with the element operation frequency vector data, i.e., with respect to operation frequency data associated with one or more of the plurality of elements. LSTM-RNN stores state changes as a function of time with respect to the element operation frequency vector data. In an embodiment, the element layout application incorporates a LSTM-RNN model into the time series model for purposes of time series forecasting with respect to the plurality of elements. In a related embodiment, based upon LSTM-RNN the element layout application stores at least one time series pattern associated with each element operation frequency vector among the element operation frequency vector data. Through time series forecasting, the element layout application identifies one or more cycle patterns over time with respect to the element operation frequency vector data. By training the time series model in conjunction with LSTM-RNN, the element layout application is configured to determine element operation frequency trends based upon the element operation frequency vector data and is configured to predict future element operation frequency vector data based upon the determined trends.

At step 515, the element layout application derives a full space layer weight vector for each element among the plurality of elements based upon any layer among the set of user interface layers in which the certain user operates on the element. According to step 515, in order to represent full space element weight for each element among the plurality of elements, the element layout application transforms the operation layer datapoint of the user history data associated with the element into a full space layer weight vector that covers the entire user interface and is indicative of any layer in the set of user interface layers in which the certain user operates on the element. In an embodiment, in order to derive the full space layer weight vector for each element per step 515, to account for future slide window data prediction the element layout application incorporates the element weight value as recalculated for the element based upon building the time series model per step 510. For instance, given 4 layers in the set of user interface layers, and given a certain element among the plurality of elements having an operation layer datapoint of 1,3 (indicating that the certain user operates on the certain element in user interface layers 1 and 3), the element layout application may derive a full space layer weight vector $L_E$ for the certain element of $L_E=(W_{E\_RECALCULATED}, 0, W_{E\_RECALCULATED}, 0)$. By deriving the full space layer weight vector for each element among the plurality of elements per step 515, the element layout application ensures that the element weight value for each element (and more specifically the element weight value for each element recalculated based upon the time series model) is applied across the set of user interface layers based upon the operation layer datapoint.

At step 520, the element layout application derives respective layer-specific dot product weight values for each element among the plurality of elements by extracting from the full space layer weight vector portions specific to respective layers in the set of user interface layers. According to step 520, the element layout application derives respective layer-specific weight vectors for each element among the plurality of elements by extracting from the full space layer weight vector weight portions specific to each respective layer in the set of user interface layers, and subsequently derives respective layer-specific dot product weight values for each element by calculating scalar dot products of the full space layer weight vector and the respective layer-specific weight vectors. Per step 520, for a certain layer in the set of user interface layers, the element layout application derives a layer-specific weight vector for the certain layer $L_{S\_CERTAIN\text{-}LAYER}$ for each element among the plurality of elements by extracting from the full space layer weight vector $L_E$ vector weight portions specific to the certain layer, and subsequently derives a layer-specific dot product weight value for the certain layer for each element by calculating a scalar dot product of the full space layer weight vector $L_E$ and the layer-specific weight vector for the certain layer $L_{S\_CERTAIN\text{-}LAYER}$, such that the layer-specific dot product weight value for the certain layer=$L_E \cdot L_{S\_CERTAIN\ LAYER}$.

In an embodiment, the element layout application derives a layer-specific weight vector for each respective layer in the set of user interface layers by accounting for layer depth. According to such embodiment, a higher layer vector weight portion within the layer-specific weight vector has a greater relative weight value than a lower layer vector weight portion in accordance with an attenuation series, such that $v_{HIGHER\_LAYER} > v_{LOWER\_LAYER}$. Furthermore, according to such embodiment, the element layout application includes a vector weight portion value of 0 for any layer higher than a certain layer upon calculating the layer-specific weight vector for the certain layer. Furthermore, the vector weight portions specific to a certain layer indicate relative element weight proportions as distributed throughout the set of user interface layers at or below the certain layer. For instance, given 4 layers, vector weight portions specific to the third layer may be distributed among the third and fourth layers, such that the element layout application may derive the layer-specific weight vector for the third layer of the 4 layers as $L_{S\_3RD\text{-}LAYER}=(0, 0, v3, v4)$, where v3>v4, i.e., where vector weight portion value v3 is greater than vector weight portion value v4 in accordance with an attenuation series. Furthermore, given vector weight portions in the context of this example for the third layer as v3=0.6 and for the fourth layer as v4=0.4, the relative weight proportion at the third layer is 60%, the relative weight proportion at the fourth layer is 40%, and v3>v4 in accordance with an attenuation series. Accordingly, the layer-specific weight vector for the third layer is $L_{S\_3RD\text{-}LAYER}=(0, 0, 0.6, 0.4)$, and the element layout application may derive the layer-specific dot product weight value for the third layer by calculating the dot product of the full space layer weight vector $L_E$ and $L_{S\_3RD\text{-}LAYER}=(0, 0, 0.6, 0.4)$. Given for purposes of this example that the full space layer weight vector is $L_E=(a, 0, 0, a)$, where "a" is a numerical element weight value, optionally equivalent to $W_{E\_RECALCULATED}$, then the element layout application may derive the layer-specific dot product weight value for the third layer as $L_E \cdot L_{S\_3RD\text{-}LAYER} = (a*0)+(0*0)+(0*0.6)+(a*0.4)$, which is equivalent to a single scalar numerical value. In the context of the layer depth embodiment, the element layout application need not consider layer depth for a bottom layer in the set of user interface layers with respect to other layers since the bottom layer is not above any other layer.

Figure 6:
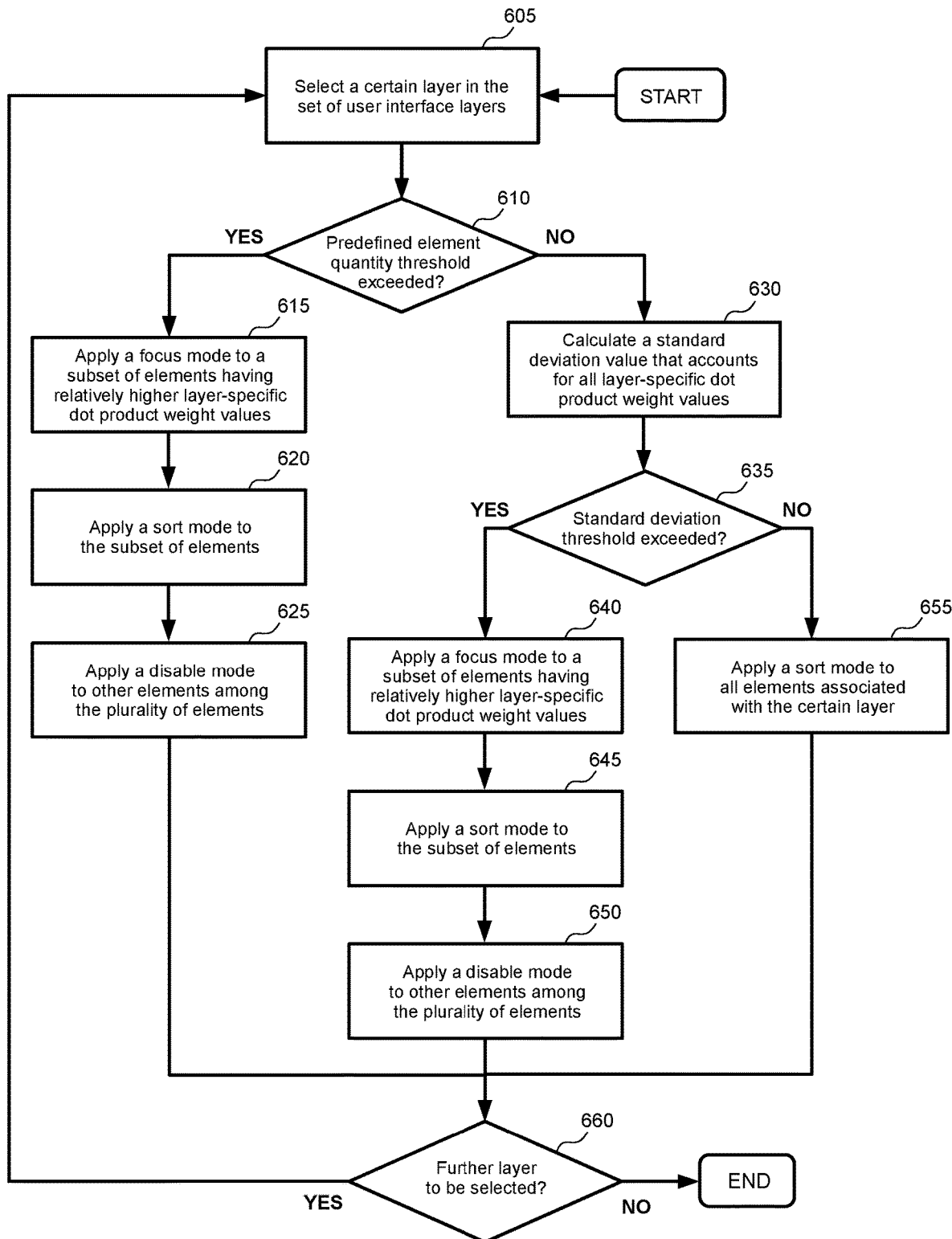
FIG. 6 illustrates a method of applying at least one layout mode to respective elements among a plurality of elements associated with each of a set of user interface layers, according to one or more embodiments.

FIG. 6 illustrates a method 600 of applying the at least one layout mode to respective elements among the plurality of elements associated with each of the set of user interface layers. The method 600 provides one or more embodiments with respect to step 420 of the method 400. The method 600 begins at step 605, where the element layout application selects a certain layer in the set of user interface layers. Based upon selection of the certain layer at step 605, the element layout application applies the at least one layout mode to respective elements among the plurality of elements associated with the certain layer by executing subsequent steps of the method 600. At step 610, the element layout application determines whether a number of elements among the plurality of elements exceeds a predefined element quantity threshold. In an embodiment, the predefined element quantity threshold is determined based upon total number of elements among the plurality of elements and is applicable to each layer in the set of user interface layers. In an alternative embodiment, the predefined element quantity threshold is layer-specific and is determined based upon a number of elements among the plurality of elements associated with the certain layer. In an further embodiment, the element layout application sets the predefined element quantity threshold based upon size attributes associated with the user interface. According to such further embodiment, the element layout application optionally sets the predefined element quantity threshold based upon a number of pixels associated with the user interface. Additionally or alternatively, the element layout application optionally sets the predefined element quantity threshold based upon at least one physical dimension of the user interface. Additionally or alternatively, the predefined element quantity threshold is adjusted based upon input from the certain user or the system administrator.

Responsive to determining that the number of elements among the plurality of elements exceeds the predefined element quantity threshold, at step 615 the element layout application applies a focus mode in the certain layer to a subset of elements among the plurality of elements associated with the certain layer having relatively higher layer-specific dot product weight values. As a focus mode is applied in the certain layer, the element layout application compares layer-specific dot product weight values derived for the certain layer. In an embodiment, the element layout application determines a size of the subset of elements having relatively higher layer-specific dot product weight value based upon the predefined element quantity threshold. According to such embodiment, the optionally designates the size of the subset of elements having relatively higher layer-specific dot product weight value as equivalent to the predefined element quantity threshold. For example, given that the predefined element quantity threshold is 100, responsive to determining that the number of elements among the plurality of elements exceeds the predefined element quantity threshold of 100, the element layout application applies a focus mode in the certain layer to a subset of 100 elements among the plurality of elements associated with the certain layer having relatively higher layer-specific dot product weight value, i.e., the top 100 elements among the plurality of elements associated with the certain layer in terms of layer-specific dot product weight value. At step 620, the element layout application applies a sort mode in the certain layer to the subset of elements in order to arrange the subset of elements by layer-specific dot product weight value. As a sort mode is applied in the certain layer, the element layout application arranges the subset of elements by layer-specific dot product weight value derived for the certain layer. In an embodiment, the element layout application applies a sort mode per step 620 subsequent to applying a focus mode per step 615. In a further embodiment, the element layout application applies a sort mode in descending order based upon layer-specific dot product weight value in order to arrange the subset of elements by layer-specific dot product weight value. At step 625, the element layout application applies a disable mode in the certain layer to other elements among the plurality of elements associated with the certain layer, i.e., elements not in the subset of elements to which a focus mode and a sort mode are applied per steps 615-620. In an embodiment, the element layout application applies a disable mode per step 625 by applying a hide mode or a delete mode to each of the other elements.

Responsive to determining that a number of elements among the plurality of elements does not exceed a predefined element quantity threshold, at step 630 the element layout application calculates for the certain layer a standard deviation value that accounts for all layer-specific dot product weight values. The standard deviation value accounts for all layer-specific dot product weight values derived for the certain layer. At step 635, the element layout application determines whether the standard deviation value calculated per step 630 exceeds a standard deviation threshold. In an embodiment, the standard deviation threshold optionally is predefined by the certain user, e.g., via the at least one user configuration aspect associated with the user interface, or alternatively is predefined by the system administrator. Responsive to determining that the calculated standard deviation value exceeds the standard deviation threshold, at step 640 the element layout application applies a focus mode in the certain layer to a subset of elements among the plurality of elements associated with the certain layer having relatively higher layer-specific dot product weight values. As a focus mode is applied in the certain layer, the element layout application compares layer-specific dot product weight values derived for the certain layer. In an embodiment, the element layout application determines a size of the subset of elements having relatively higher layer-specific dot product weight value based upon a number of elements within a predefined range of a mean layer-specific dot product weight value. In an additional embodiment, the focus mode applied at step 640 is identical to the focus mode applied at step 615. At step 645, the element layout application applies a sort mode in the certain layer to the subset of elements in order to arrange the subset of elements by layer-specific dot product weight value. As a sort mode is applied in the certain layer, the element layout application arranges the subset of elements by layer-specific dot product weight value derived for the certain layer. In an embodiment, the element layout application applies a sort mode per step 645 subsequent to applying a focus mode per step 640. In a further embodiment, the element layout application applies a sort mode in descending order based upon layer-specific dot product weight value in order to sort the subset of elements by layer-specific dot product weight value. In a further embodiment, the sort mode applied at step 645 is identical to the sort mode applied at step 620. At step 650, the element layout application applies a disable mode in the certain layer to other elements among the plurality of elements associated with the certain layer, i.e., elements not in the subset of elements to which a focus mode and a sort mode are applied per steps 640-645. In an embodiment, the element layout application applies a disable mode per step 650 by applying a hide mode or a delete mode to each of the other elements. In an additional embodiment, the disable mode applied at step 650 is identical to the disable mode applied at step 625.

Responsive to determining that the calculated standard deviation value does not exceed the standard deviation threshold, at step 655 the element layout application applies a sort mode in the certain layer to all elements among the plurality of elements associated with the certain layer in order to arrange all elements by layer-specific dot product weight value. As a sort mode is applied in the certain layer, the element layout application arranges all of the elements among the plurality of elements by layer-specific dot product weight value derived for the certain layer. In an embodiment, the sort mode applied at step 655 is identical to the sort mode applied at step 645. Optionally, the element layout application refrains from applying a sort mode to any element among the plurality of elements in the context of the method 600 responsive to determining that the number of elements among the plurality of elements does not exceed a predefined minimum element quantity threshold. Optionally, the predefined minimum element quantity threshold is determined by the certain user, e.g., via the at least one user configuration aspect associated with the user interface, or by the system administrator.

At step 660, the element layout application determines whether there is a further layer in the set of user interface layers yet to be selected. Responsive to determining that there is a further layer to be selected, the element layout application returns to step 605 to repeat steps of the method 600 with respect to the further layer. Responsive to determining that there is no further layer to be selected, the element layout application proceeds directly to the end of the method 600.

The descriptions of the various embodiments have been presented for purposes of illustration but are not intended to be exhaustive or limited to the embodiments disclosed. All kinds of modifications made to the described embodiments and equivalent arrangements should fall within the protected scope of the various embodiments. Hence, the scope should be explained most widely according to the claims that follow in connection with the detailed description and should cover all possibly equivalent variations and equivalent arrangements. Many modifications and variations will be apparent to those of ordinary skill in the art without departing from the scope and spirit of the described embodiments. The terminology used herein is chosen to best explain the principles of the various embodiments, the practical application or technical improvement over technologies found in the marketplace, or to enable others of ordinary skill in the art to understand the various embodiments.

What is claimed is:

1. A computer-implemented method comprising:
    initializing an element layout within a set of user interface layers for a certain user, wherein the element layout is randomly determined responsive to assigning the certain user to a cluster among a plurality of clusters based upon user identification information, and wherein the element layout includes a plurality of elements on which the certain user operates;
    responsive to determining that a predefined user history data threshold is exceeded for the certain user, deriving weight metrics for the plurality of elements in association with each of the set of user interface layers based upon user history data for the certain user;
    applying at least one layout mode to respective elements among the plurality of elements associated with each of the set of user interface layers based upon the derived weight metrics;
    deriving a full space layer weight vector for each element among the plurality of elements based upon any layer among the set of user interface layers in which the certain user operates on the element, wherein the full space layer weight vector is based on the derived weight metrics for the certain user; and
    updating the element layout within each of the set of user interface layers for the certain user consequent to applying the at least one layout mode.

2. The computer-implemented method of claim 1, wherein deriving the weight metrics for the plurality of elements comprises:
    calculating an element weight value for each element among the plurality of elements based upon respective operation frequency values for the element for a plurality of slide windows of the user history data, wherein an operation frequency value among the respective operation frequency values represents a number of times the certain user operates on the element; and
    recalculating the element weight value for each element among the plurality of elements based upon building a time series model incorporating element operation frequency vector data, wherein the element operation frequency vector data is derived by recording an element operation frequency vector for each of the plurality of slide windows that indexes by operation frequency value a predefined number of elements among the plurality of elements.

3. The computer-implemented method of claim 2, wherein deriving the weight metrics for the plurality of elements further comprises:
    deriving respective layer-specific dot product weight values for each element among the plurality of elements by extracting from the full space layer weight vector portions specific to respective layers in the set of user interface layers.

4. The computer-implemented method of claim 2, wherein calculating the element weight value for each element among the plurality of elements comprises:
    summing respective products of an operation frequency value for the element and a slide window weight calculated for each of the plurality of slide windows of the user history data, wherein the slide window weight is relatively higher for relatively more recent slide windows among the plurality of slide windows.

5. The computer-implemented method of claim 2, wherein building the time series model comprises applying at least one machine learning algorithm to predict at least one future element operation frequency vector for at least one future slide window beyond the plurality of slide windows.

6. The computer-implemented method of claim 2, wherein building the time series model comprises training the time series model in conjunction with a long short-term memory recurrent neural network (LSTM-RNN) architecture configured to store at least one time series pattern associated with the element operation frequency vector data.

7. The computer-implemented method of claim 1, wherein applying the at least one layout mode to respective elements among the plurality of elements associated with each of the set of user interface layers comprises, for a certain layer in the set of user interface layers:
    responsive to determining that a number of elements among the plurality of elements exceeds a predefined element quantity threshold:
        applying a focus mode in the certain layer to a subset of elements among the plurality of elements associated with the certain layer having relatively higher layer-specific dot product weight values,
        applying a sort mode in the certain layer to the subset of elements in order to arrange the subset of elements by layer-specific dot product weight value, and
        applying a disable mode in the certain layer to other elements among the plurality of elements associated with the certain layer.

8. The computer-implemented method of claim 1, wherein applying the at least one layout mode to respective elements among the plurality of elements associated with each of the set of user interface layers comprises, for a certain layer in the set of user interface layers:
    responsive to determining that a number of elements among the plurality of elements does not exceed a predefined element quantity threshold, calculating for the certain layer a standard deviation value that accounts for all layer-specific dot product weight values;

responsive to determining that the calculated standard deviation value exceeds a standard deviation threshold:
  applying a focus mode in the certain layer to a subset of elements among the plurality of elements associated with the certain layer having relatively higher layer-specific dot product weight values,
  applying a sort mode in the certain layer to the subset of elements in order to arrange the subset of elements by layer-specific dot product weight value, and
  applying a disable mode in the certain layer to other elements among the plurality of elements associated with the certain layer.

9. The computer-implemented method of claim 8, wherein applying the at least one layout mode to respective elements among the plurality of elements associated with each of the set of user interface layers further comprises, for the certain layer in the set of user interface layers:
  responsive to determining that the calculated standard deviation value does not exceed the standard deviation threshold, applying a sort mode in the certain layer to all elements among the plurality of elements associated with the certain layer in order to arrange all elements by layer-specific dot product weight value.

10. A computer program product comprising a computer readable storage medium having program instructions embodied therewith, the program instructions executable by a computing device to cause the computing device to:
  initialize an element layout within a set of user interface layers for a certain user, wherein the element layout is randomly determined responsive to assigning the certain user to a cluster among a plurality of clusters based upon user identification information, and wherein the element layout includes a plurality of elements on which the certain user operates;
  responsive to determining that a predefined user history data threshold is exceeded for the certain user, derive weight metrics for the plurality of elements in association with each of the set of user interface layers based upon user history data for the certain user;
  apply at least one layout mode to respective elements among the plurality of elements associated with each of the set of user interface layers based upon the derived weight metrics;
  deriving a full space layer weight vector for each element among the plurality of elements based upon any layer among the set of user interface layers in which the certain user operates on the element, wherein the full space layer weight vector is based on the derived weight metrics for the certain user; and
  update the element layout within each of the set of user interface layers for the certain user consequent to applying the at least one layout mode.

11. The computer program product of claim 10, wherein deriving the weight metrics for the plurality of elements comprises:
  calculating an element weight value for each element among the plurality of elements based upon respective operation frequency values for the element for a plurality of slide windows of the user history data, wherein an operation frequency value among the respective operation frequency values represents a number of times the certain user operates on the element; and
  recalculating the element weight value for each element among the plurality of elements based upon building a time series model incorporating element operation frequency vector data, wherein the element operation frequency vector data is derived by recording an element operation frequency vector for each of the plurality of slide windows that indexes by operation frequency value a predefined number of elements among the plurality of elements.

12. The computer program product of claim 11, wherein deriving the weight metrics for the plurality of elements further comprises:
  deriving respective layer-specific dot product weight values for each element among the plurality of elements by extracting from the full space layer weight vector portions specific to respective layers in the set of user interface layers.

13. The computer program product of claim 11, wherein calculating the element weight value for each element among the plurality of elements comprises:
  summing respective products of an operation frequency value for the element and a slide window weight calculated for each of the plurality of slide windows of the user history data, wherein the slide window weight is relatively higher for relatively more recent slide windows among the plurality of slide windows.

14. A system comprising:
  at least one processor; and
  a memory storing an application program, which, when executed on the at least one processor, performs an operation comprising:
    initializing an element layout within a set of user interface layers for a certain user, wherein the element layout is randomly determined responsive to assigning the certain user to a cluster among a plurality of clusters based upon user identification information, and wherein the element layout includes a plurality of elements on which the certain user operates;
    responsive to determining that a predefined user history data threshold is exceeded for the certain user, deriving weight metrics for the plurality of elements in association with each of the set of user interface layers based upon user history data for the certain user;
    applying at least one layout mode to respective elements among the plurality of elements associated with each of the set of user interface layers based upon the derived weight metrics;
    deriving a full space layer weight vector for each element among the plurality of elements based upon any layer among the set of user interface layers in which the certain user operates on the element, wherein the full space layer weight vector is based on the derived weight metrics for the certain user; and
    updating the element layout within each of the set of user interface layers for the certain user consequent to applying the at least one layout mode.

15. The system of claim 14, wherein deriving the weight metrics for the plurality of elements comprises:
  calculating an element weight value for each element among the plurality of elements based upon respective operation frequency values for the element for a plurality of slide windows of the user history data, wherein an operation frequency value among the respective operation frequency values represents a number of times the certain user operates on the element; and
  recalculating the element weight value for each element among the plurality of elements based upon building a time series model incorporating element operation frequency vector data, wherein the element operation frequency vector data is derived by recording an element operation frequency vector for each of the plurality of slide windows that indexes by operation frequency value a predefined number of elements among the plurality of elements.

17. The system of claim 15, wherein deriving the weight metrics for the plurality of elements further comprises:
deriving respective layer-specific dot product weight values for each element among the plurality of elements by extracting from the full space layer weight vector portions specific to respective layers in the set of user interface layers.

17. The system of claim 15, wherein calculating the element weight value for each element among the plurality of elements comprises:
summing respective products of an operation frequency value for the element and a slide window weight calculated for each of the plurality of slide windows of the user history data, wherein the slide window weight is relatively higher for relatively more recent slide windows among the plurality of slide windows.

\* \* \* \* \*